(12) United States Patent
Oosuka et al.

(10) Patent No.: US 7,409,650 B2
(45) Date of Patent: Aug. 5, 2008

(54) LOW POWER CONSUMPTION DESIGNING METHOD OF SEMICONDUCTOR INTEGRATED CIRCUIT

(75) Inventors: Noriko Oosuka, Sagamihara (JP); Masaki Ishino, Sagamihara (JP); Isao Motegi, Yokohama (JP); Hiroki Tomoshige, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 364 days.

(21) Appl. No.: 11/326,577

(22) Filed: Jan. 6, 2006

(65) Prior Publication Data

US 2006/0190848 A1 Aug. 24, 2006

(30) Foreign Application Priority Data

Jan. 7, 2005 (JP) .................. P2005-002426

(51) Int. Cl.
*G06F 17/50* (2006.01)
(52) U.S. Cl. .................. 716/2; 716/4; 716/18
(58) Field of Classification Search .................. 716/2, 716/4, 18
See application file for complete search history.

(56) References Cited

U.S. PATENT DOCUMENTS

| 6,195,787 | B1 | 2/2001 | Yokoyama |
| 6,237,132 | B1 * | 5/2001 | Dean et al. .................. 716/18 |
| 6,397,170 | B1 | 5/2002 | Dean et al. |
| 6,523,157 | B1 * | 2/2003 | Takahashi et al. .................. 716/10 |
| 2004/0044974 | A1 * | 3/2004 | Sharma et al. .................. 716/5 |
| 2004/0123249 | A1 | 6/2004 | Sato et al. |

FOREIGN PATENT DOCUMENTS

| JP | 09-246389 | 9/1997 |
| JP | 2001-350815 | 12/2001 |
| JP | 2002-318826 | 10/2002 |
| JP | 2004-054756 | 2/2004 |

OTHER PUBLICATIONS

Japanese Office Action issued in Japanese Patent Application No. JP 2005-002426, dated Apr. 2, 2008.

* cited by examiner

*Primary Examiner*—Stacy A Whitmore
*Assistant Examiner*—Magid Y Dimyan
(74) *Attorney, Agent, or Firm*—McDermott Will & Emery LLP

(57) ABSTRACT

In a standard cell synthesizing step 101, a net list is synthesized from an RTL description, and an instance name list is formed which contrasts a register description portion with an instance name contained in the net list; in a simulation step 103, an operation simulation written by the RTL description is carried out; the toggle information among registers which is extracted in the simulation step 103 is recorded in a toggle storing step 104, a flip-flop-to-flip-flop toggle information database is constructed in which the recorded toggle information corresponds to a flip-flop-to-flip-flop instance name obtained from the instance name list in a mapping step 105; and in an electric power optimizing step 102, a physical designing operation for reducing power consumption is optimized by employing the net list, the flip-flop-to-flip-flop toggle information database, and a timing restriction.

1 Claim, 5 Drawing Sheets

— TOGGLE A
······ TOGGLE B
—·—· TOGGLE C

ACTIVATING RATE REPRESENTING DRAWING

LOW POWER CONSUMPTION DESIGNING METHOD OF SEMICONDUCTOR INTEGRATED CIRCUIT

BACKGROUND OF THE INVENTION

1. Field of the Invention

The present invention is related to a lower power consumption designing method of a semiconductor integrated circuit.

2. Description of the Related Art

In connection with increases of circuit scales in semiconductor integrated circuits, increases of electric power consumed in these semiconductor integrated circuits may cause a problem. Therefore, low power consumption designing methods have been conventionally developed and carried out in order to reduce the power consumption. More specifically, since portable appliances have been recently popularized, it is a very important aspect that power consumption of semiconductor integrated circuits mounted on these portable appliances may be reduced as much as possible.

As low power consumption designing methods for semiconductor integrated circuits, such a conventional low power consumption designing method requires a repetition of layout designing operation, and therefore, may induce an increase in developing cost. In the conventional designing method, after a layout designing operation has been accomplished, magnitudes of currents flowing through respective circuit portions within the semiconductor integrated circuit are confirmed, and then, the layout is corrected in order to reduce power consumption.

In contrast to the above-described designing method, another conventional designing method has been conventionally carried out in which power consumption is estimated before a layout designing operation, and the estimated power consumption is reflected to the layout designing operation. Concretely speaking, a designing method disclosed in JP-A-9-246389 is carried out in order to reduce power consumption as follows: That is, a logic simulation of a semiconductor integrated circuit is carried out which should be designed; power consumption is estimated by totalizing toggle operation times of each of circuit portions; and a restriction condition in a layout designing operation is determined based upon the estimated power consumption.

Also, a designing method disclosed in JP-A-2002-318826 is performed as follows: That is, while an attention is paid to such a fact that power consumption as to two sorts of flip-flops having different operating characteristics is changed, depending upon data operating rates and input waveform transition times, such flip-flops are individually selected, the power consumption of which becomes low in response to a data operating rate and an input waveform transition time every logic path.

FIG. 9 is a flow chart for describing a conventional low power consumption designing method of a semiconductor integrated circuit. In FIG. 9, a semiconductor integrated circuit designing method is constituted by a logic synthesizing step 201, an arrangement synthesizing step 204, a clock tree synthesis step 207, and a wiring line optimizing step 208. In the respective stages of this conventional low power consumption designing method, the above-described electric power optimizing method is employed, and in order to perform this electric power optimizing method, uniform toggle information is applied to the respective circuit portions.

However, in the above-explained conventional low power consumption designing method, both the structural elements and the wiring line systems have been determined after the logic synthesizing operation, and thereafter, the logic simulation is carried out. As a consequence, there is such a problem that lengthy time is necessarily required until the toggle information is acquired.

Also, in order to shorten the time, such a designing method for applying the uniform toggle information has been employed. However, with respect to such uniform toggle information, an information amount is small and precision is low. As a result, there is another problem that such a low power consumption capable of achieving a maximum effect cannot be realized.

SUMMARY OF THE INVENTION

The present invention has an object to provide a low power consumption designing method of a semiconductor integrated circuit, capable of extracting toggle information in an upper grade step of the semiconductor integrated circuit designing method, and capable of reducing power consumption by applying the extracted toggle information when a logic synthesizing operation is carried out, and when a layout designing operation is carried out.

A low power consumption designing method of a semiconductor integrated circuit, according to the present invention, is featured by comprising: a standard cell synthesizing step of synthesizing a net list from an RTL (register transfer level) description of a circuit structure so as to form an instance name list which contrasts a register description portion contained in the RTL description with an instance name; a simulation step of inputting thereinto an applied actual operation pattern so as to perform an operation simulation written by the RTL description; a toggle storing step of recording toggle information among registers extracted in the simulation step; a mapping step of constituting flip-flop-to-flip-flop toggle information database in which the toggle information acquired from the toggle storing step corresponds to a flip-flop-to-flip-flop instance name acquired from the instance name list; and an electric power optimizing step of optimizing a physical designing operation in order to reduce power consumption by employing the net list, the flip-flop-to-flip-flop toggle information database, and an arbitrarily applied timing restriction.

In the present invention, the electric power optimizing step includes: a toggle trace step of tracing flip-flops of the net list and for applying the toggle information to each of traced instances; a capacitance extracting step of extracting a capacitance of a wiring line between the instances to which the toggle information is applied; a circuit reconstructing step of reconstructing a circuit based upon the capacitance value extracted from the capacitance extracting step and the toggle information acquired from the mapping step in such a manner that a capacitance of a wiring line whose activating rate is high is decreased; and a static electric power analyzing step of calculating power consumption of the circuit from both the capacitance value extracted by the capacitance extracting step and the toggle information.

In the present invention, the toggle trace step includes: a clock toggle applying step of applying the toggle information to a clock line based upon the net list and the timing restriction; a flip-flop-to-flip-flop toggle applying step of tracing a signal from an output terminal side of a flip-flop by employing the net list, the timing restriction, and the toggle information of the flip-flop-to-flip-flop toggle database, and for allocating the toggle information to all of signals among the flip-flops; and a toggle selecting step of selecting a maximum value of the toggle information in such a wiring line that the toggle information is overlapped with each other. Furthermore, in the toggle selecting step, a minimum value of the toggle information is selected instead of the maximum value of the toggle information in the wiring line in which the toggle information is overlapped with each other.

In the present invention, a voltage drop analysis is carried out which includes: a resistance extracting step of extracting a resistance value of a semiconductor integrated circuit power supply network; and a power supply voltage drop measuring step of performing a power supply voltage drop measurement from both the power consumption value obtained from the static electric power analyzing step and the resistance value obtained from the resistance extracting step.

In the present invention, an optimized network list is formed by selecting such a case that the power consumption can be reduced in the highest degree, while a plurality of flip-flop-to-flip-flop toggle information databases constituted in the mapping step are employed in response to a plurality of actual operation patterns given in the simulation step, and a plurality of power consumption values responding to the plurality of actual operation patterns acquired in the electric power optimizing step are compared with each other.

In the present invention, the low power consumption designing method recited in any one of Claim 1 to Claim 6 is executed at each step after a logic synthesizing step, an arrangement synthesizing step, and a wiring line optimizing step.

In the present invention, cell groups on a layout are separated from each other based upon activating rates, and a power supply control is applied while a non-activating region is set as a separate power supply.

In accordance with the above-explained arrangement, the toggle information is extracted from the RTL description having the higher abstract degree by the function simulation, and the power consumption is predicted. Then, since the predicted power consumption information is applied when the logic synthesizing operation is carried out, and when the layout designing operation is carried out, the lower power consumption can be realized. As a result, when the respective circuit elements for constituting the semiconductor integrated circuit are determined, and when the respective circuit elements are arranged and are wired, such a power consumption value having higher reliability can be obtained as the predicted power consumption value. Thus, the lower power consumption capable of achieving the maximum effect can be realized in a higher efficiency and in hither precision.

In accordance with the present invention, the toggle information is extracted from the RTL description having the higher abstract degree, and the extracted toggle information is applied when the logic synthesizing operation is carried out and when the layout designing operation is carried out. As a consequence, such a low power consumption designing method of a semiconductor integrated circuit capable of achieving the maximum effect so as to reduce the power consumption can be provided.

DESCRIPTION OF THE PREFERRED EMBODIMENTS

Figure 1:
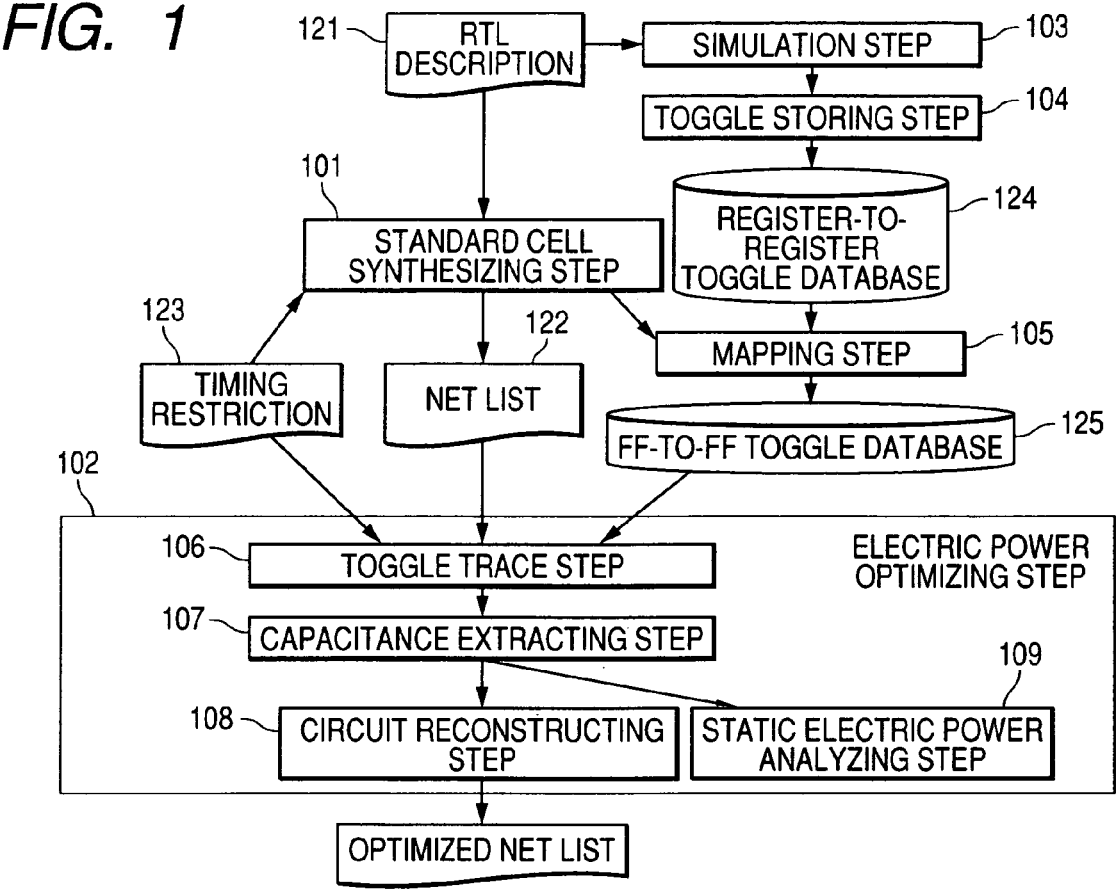
FIG. 1 is a flow chart for indicating a low power consumption designing method of a semiconductor integrated circuit according to an embodiment mode of the present invention.

FIG. 1 is a flow chart for indicating a lower power consumption designing method of a semiconductor integrated circuit according to an embodiment mode of the present invention. In FIG. 1, the lower power consumption designing method of the semiconductor integrated circuit is constituted by a standard cell synthesizing step 101, a power optimizing step 102, a simulation step 103, a toggle storing step 104, and a mapping step 105.

The standard cell synthesizing step 101 corresponds to a step of synthesizing a net list 122 from an RTL description 121 of a circuit structure. The standard cell synthesizing step 101 outputs a register description portion contained in the RTL description 121, and a correspondence list of an instance name contained in the net list 122 in addition to the formed net list 122.

The simulation step 103 corresponds to such a step that an operation simulation is carried out by inputting an operation pattern into a circuit described by the RTL description 121. The simulation step 103 passes toggle information of a signal operated in this case to the toggle storing step 104.

Figure 2:
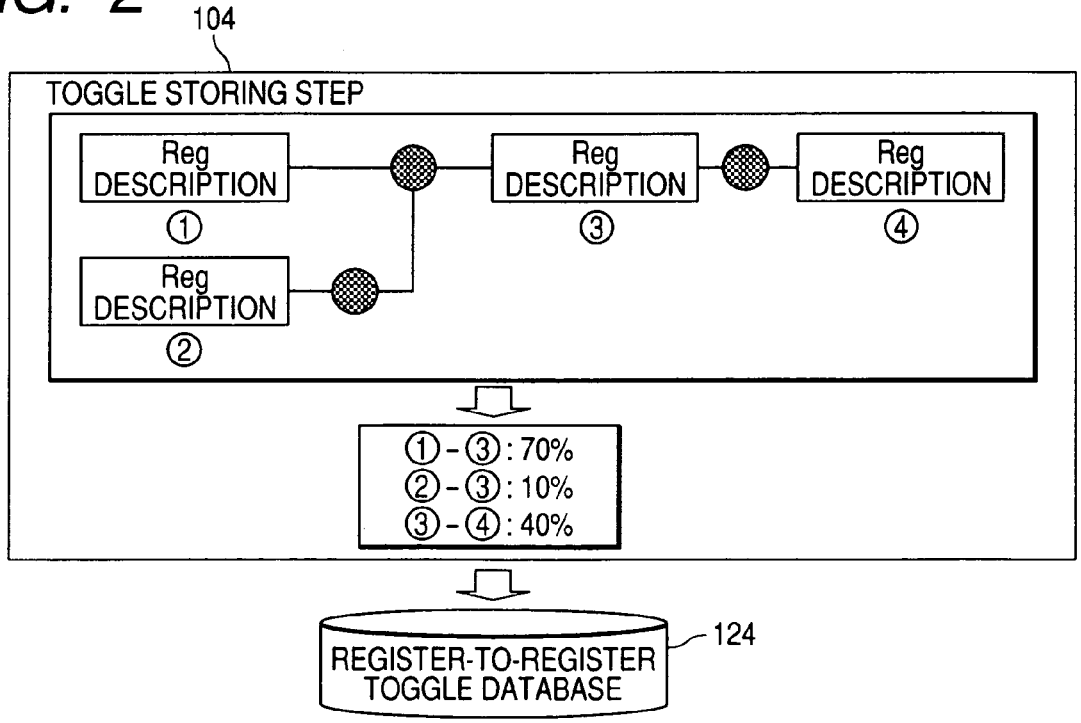
FIG. 2 is a diagram for explaining a processed content of a toggle storing step in the embodiment mode of the present invention.

FIG. 2 is a diagram for explaining a processed content of the toggle storing step 104. In this toggle storing step 104, the toggle information of the RTL base acquired in the simulation step 103 is allocated to respective registers, and activating rates with respect to each of register descriptions are collected so as to construct a register-to-register toggle database 124.

The mapping step 105 constitutes an flip-flop-to-flip-flop (will be referred to as "FF-to-FF" hereinafter) toggle database 125 from both the register-to-register database 124, and the correspondence list of the instance names obtained from the standard cell synthesizing step 101, while the FF-to-FF toggle database 125 corresponds to such a database that toggle information is converted into toggle information among flip-flops contained in the net list 122.

As to the toggle information among FFs (flip-flops) acquired in this mapping step 105, even in such a case that a circuit is changed in a post stage, since the instance names of FFs are not changed, the toggle information among FFs can be utilized even in any steps of the layout step. In the previous steps, as information which is required in order to optimize electric power in the post steps, both a net list for representing a circuit structure before power optimization, and the toggle information among FFs are acquired.

The power optimization step 102 is arranged by a toggle trace step 106, a capacitance extracting step 107, a circuit reconstructing step 108, and a static electric power analyzing step 109.

Figure 3:
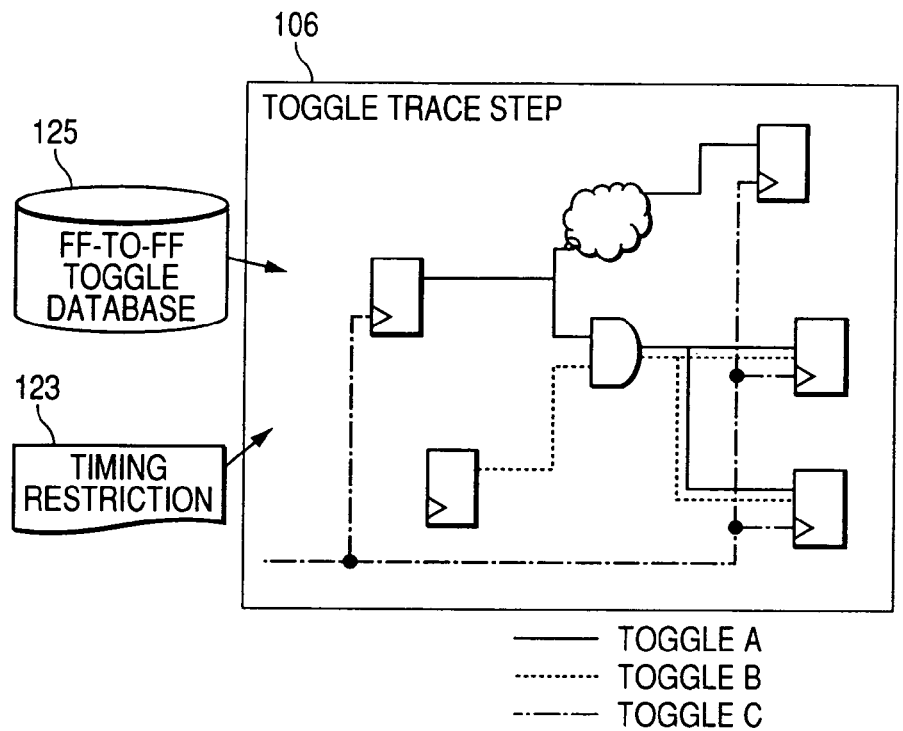
FIG. 3 is a diagram for explaining a processed content of a toggle trace step in the embodiment mode of the present invention.

FIG. 3 is a diagram for explaining a processed content of the toggle trace step 106. In this explanatory diagram, as indicated by a toggle A and a toggle B of FIG. 3, the toggle information of the FF-to-FF toggle database 125 is traced from an output point of a pre-stage FF, so that the toggle information is allocated to all of signals among FFs, and further, as to a clock line, as represented in a toggle C of FIG. 3, the toggle information is applied by inputting a timing restriction.

Figure 4:
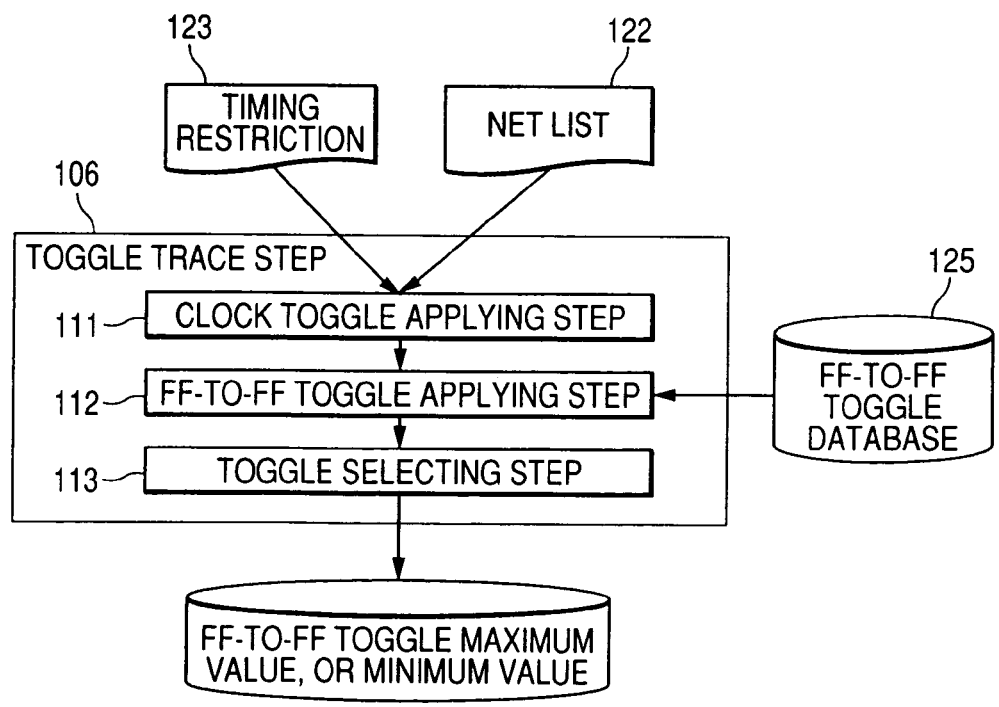
FIG. 4 is a flow chart for explaining a processing method of a toggle trace step in the embodiment mode of the present invention.

FIG. 4 is a flow chart for describing a processing method of the toggle trace step 106 in detail. In FIG. 4, the toggle trace step 106 is arranged by a clock toggle applying step 111, an FF-to-FF toggle applying step 112, and a toggle selecting step 113.

The clock toggle applying step 111 corresponds to such a step that both the net list 122 and the timing restriction 123 are inputted, a clock frequency is extracted from the timing restriction 123, and toggle information is applied with respect to a clock line.

The FF-to-FF toggle applying step 112 corresponds to such a step that both the FF-to-FF toggle database 125 and the timing restriction 123 are inputted, a net list is traced from an output of an FF of a prestage toward an FF of a post stage, and toggle information obtained from the FF-to-FF toggle database 125 is applied with respect to a wiring line on a route.

The toggle selecting step 113 corresponds to such a step that in the case that there is a wiring line to which toggle information has been applied in a dual manner, either a maximum value or a minimum value of the applied toggle values is selected.

In the capacitance extracting step 107, a capacitance of a wiring line is extracted by considering either a virtual wiring line or an actual wiring line, and this extracted capacitance of the wiring line is passed to both the circuit reconstructing step 108 and the static electric power analyzing step 109.

In the circuit reconstructing step 107, a circuit is reconstructed based upon both the wiring line capacitance value and the toggle information obtained from the capacitance extracting step 107 in such a manner that a capacitance of a wiring line whose activating rate is high is decreased, and such a net list whose electric power is optimized is outputted.

In the electric static power analyzing step 109, power consumption of the circuit is calculated based upon the capacitance value of the wiring line and the toggle information.

Figure 5:
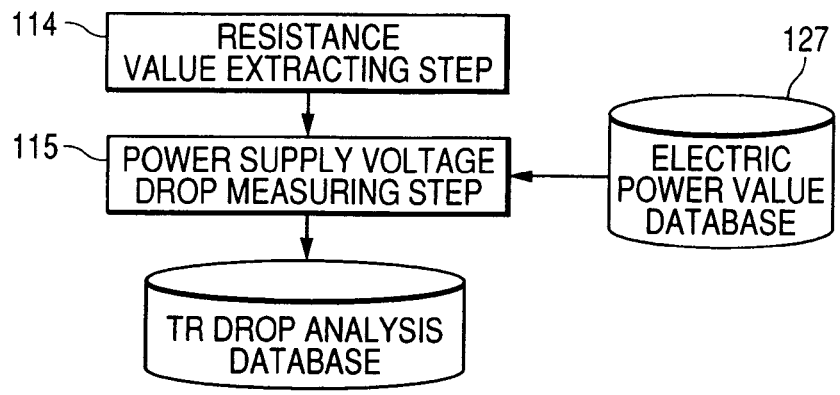
FIG. 5 is a flow chart for indicating a method of performing a voltage drop analysis in the embodiment mode of the present invention.

FIG. 5 is a flow chart for indicating a method for further performing a voltage drop analysis by employing the power consumption value obtained in this step. In this method, in a resistance extracting step 114, a resistance value of a semiconductor integrated circuit power network is extracted; and in a power supply voltage drop measuring step 115, a power supply voltage drop measurement is carried out based upon the power consumption value which is obtained from the static electric power analyzing step 109 to a power value database 127, and also, the resistance value obtained from the resistance extracting step 114.

Figure 6:
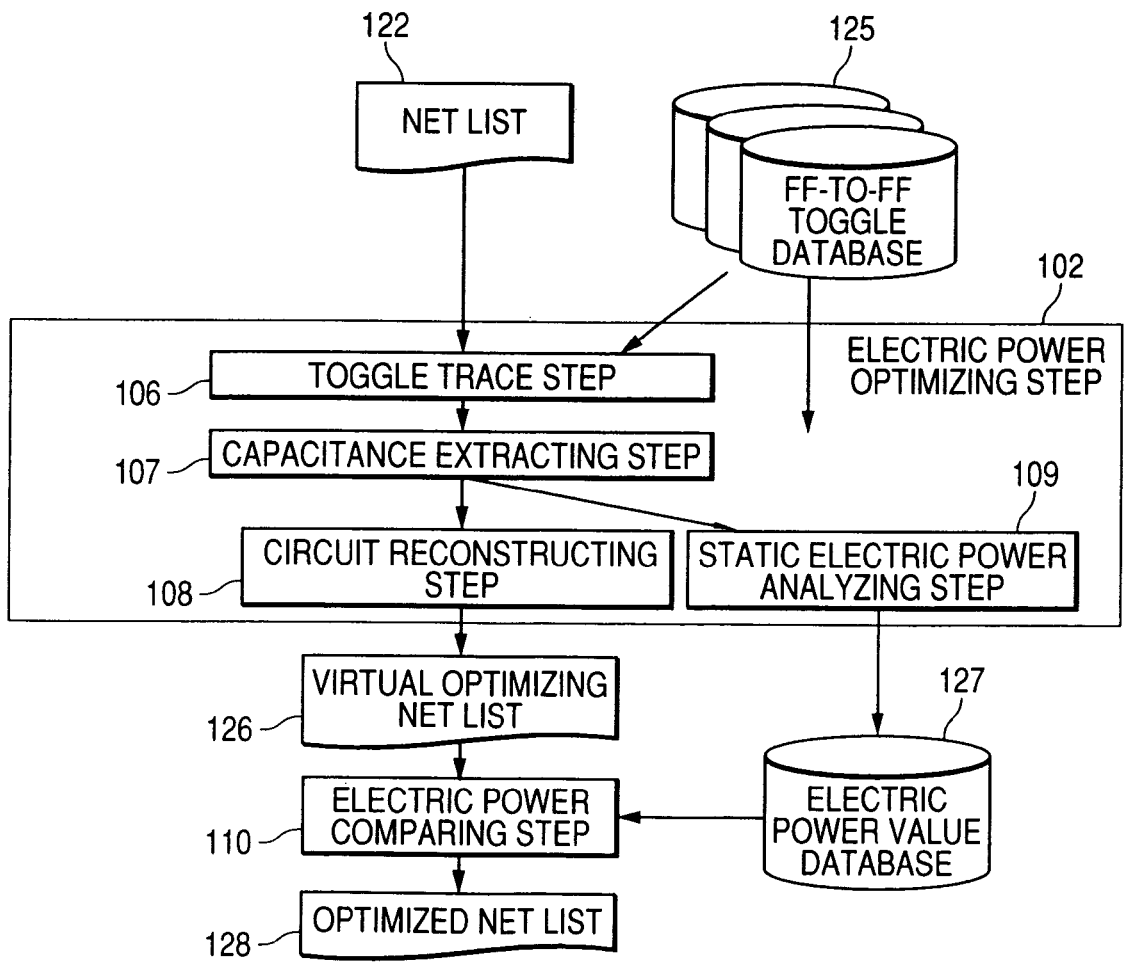
FIG. 6 is a flow chart for indicating a method of achieving an electric power optimizing operation in the embodiment mode of the present invention.

FIG. 6 is a flow chart for describing a method for furthermore achieving a power optimizing operation while considering the above-explained low power consumption designing method of the semiconductor integrated circuit. In this achieving method, the following manner is employed: That is, a plurality of FF-to-FF toggle databases 125 which have been formed from several sorts of simulation patterns are sequentially inputted to the power optimizing step 102, and then, an optimum solution is selected by comparing the power optimizing results with each other.

In FIG. 6, a power optimizing operation is carried out by inputting a first FF-to-FF toggle database 125 in the power optimizing step 102. Both a virtual optimized net list 126 obtained as this optimizing result and an FF-to-FF toggle database 125 of another operation pattern are again inputted to the power optimizing step 102, and a power comparing step 110 for comparing the power consumption values outputted from an electric power database 127 is executed. Since this process operation is repeatedly carried out, an optimized net list 128 capable of applying an optimum solution from a plurality of operation patterns is formed.

Figure 7:
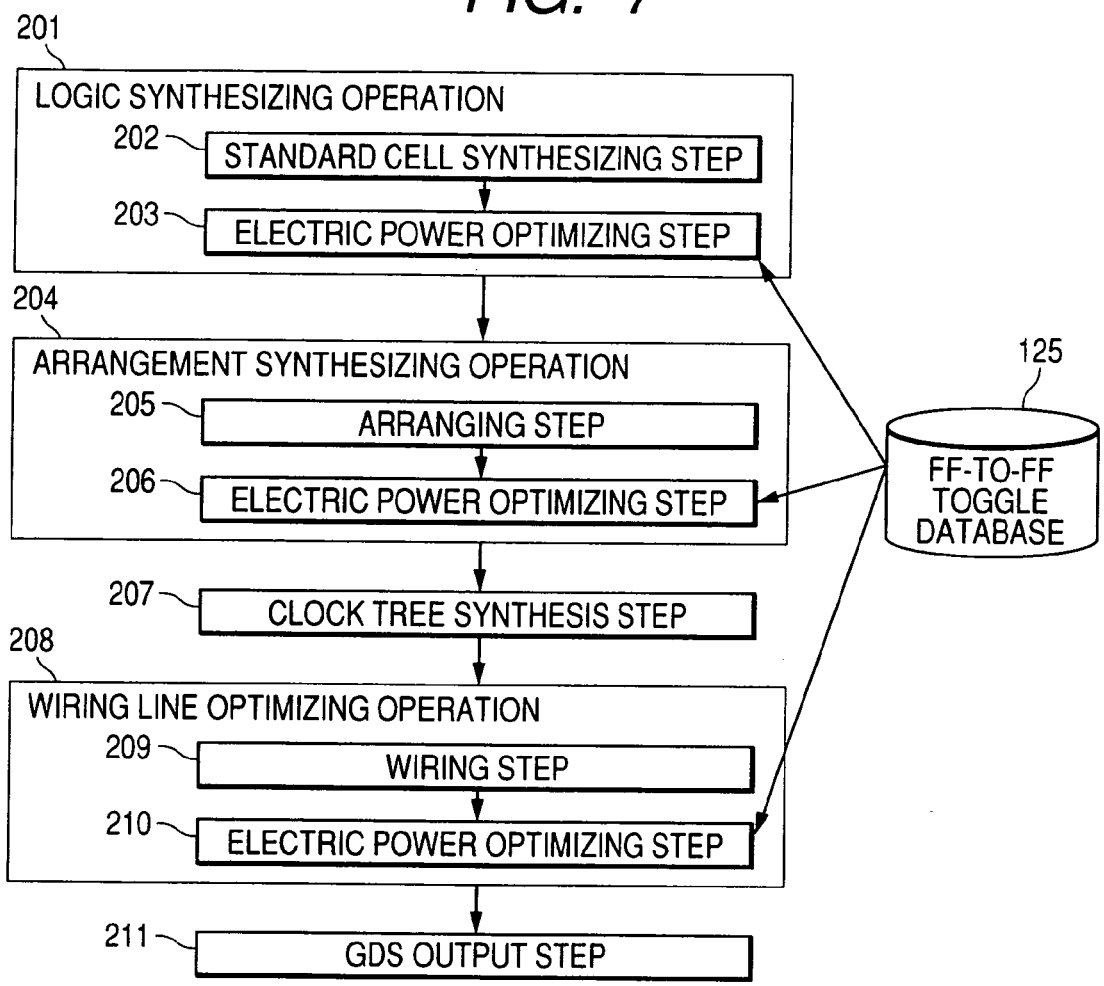
FIG. 7 is a flow chart for describing a method of performing an electric power optimizing operation to which the present invention is applied.

FIG. 7 is a flow chart for explaining a method for executing a power optimizing operation to which the low power consumption designing method of the semiconductor integrated circuit according to the present invention has been applied. In FIG. 7, the method of executing the power optimizing operation is constituted by a logic synthesizing step 201, an arrangement synthesizing step 204, a clock tree synthesis step 207, and a wiring line optimizing step 208.

The logic synthesizing step 201 is constituted by a standard cell synthesizing step 202 and an electric power optimizing step 203. In the electric power optimizing step 203, since the information of the FF-to-FF toggle database 125 is inputted, a circuit is reconstructed in such a manner that an input pin capacitance of a wiring line whose activating rate is high is decreased.

The arrangement synthesizing step 204 is constituted by an arranging step 205 and an electric power optimizing step 206. In the electric power optimizing step 206, since the information of the FF-to-FF toggle database 125 is inputted, an arrangement optimizing operation is carried out in such a manner that a virtual wiring line capacitance is extracted, and a capacitance of a wiring line whose activating rate is high is decreased.

The wiring line optimizing step 208 is constituted by a wiring step 209 and an electric power optimizing step 210. In the electric power optimizing step 210, since the information of the FF-to-FF toggle database 125 is inputted, a wiring line optimizing operation is carried out in such a manner that an actual wiring line capacitance is extracted, and a capacitance of a wiring line whose activating rate is high is decreased.

Since these steps are carried out, the electric power optimizing operation can be carried out in a stepwise manner from such a condition that an abstract degree of physical information (layout information) is high. As a result, a maximum effect can be obtained.

Figure 8:
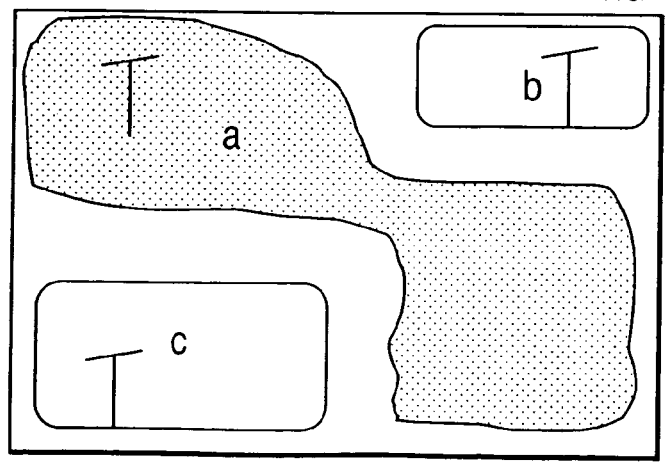
FIG. 8 is a diagram for representing activating rates in the embodiment of the electric power optimizing operation to which the present invention is applied.
Figure 9:
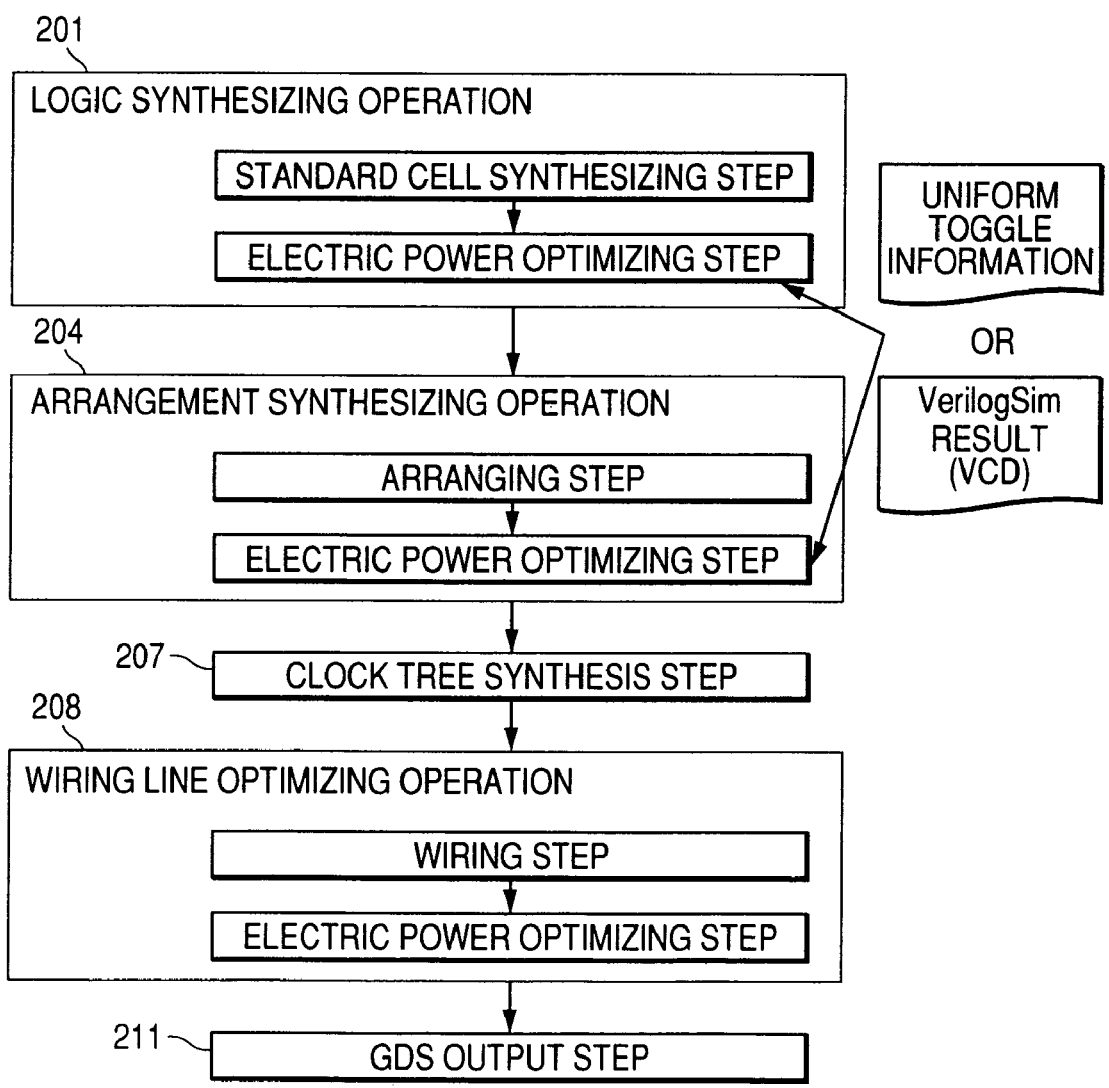
FIG. 9 is a flow chart for indicating the conventional low power consumption designing method of the semiconductor integrated circuit.

FIG. 8 is a diagram for representing activating rates in the embodiment of the above-described electric power optimizing method. In FIG. 8, the activating rates are displayed on a layout drawing, while the activating rates are acquired from the FF-to-FF toggle databases of the operation patterns in either the electric power optimizing step 206 of the arrangement synthesizing step or the electric power optimizing step 210 of the wiring line optimizing step.

Since this drawing indicates an electric power distribution which is classified in colors based upon the activating rates every cell group, such a portion which becomes a non-activating region is defined as a separate power supply based upon this power distribution representation. As a result, in order to reduce a leak current during operations in the semiconductor integrated circuit, such a region to which a power supply control operation is applied can be extracted.

The low power consumption designing method of the semiconductor integrated circuit, according to the present invention, owns such an effect that the toggle information is extracted from the RTL descriptions having the higher abstract degrees, and then, the extracted toggle information is applied when the logic synthesizing operation is carried out, and when the layout designing operation is carried out, so that the maximum effect can be achieved so as to reduce the power consumption. The lower power consumption designing method is useful as the lower power consumption technical idea of the semiconductor integrated circuit.

What is claimed is:

1. A low power consumption designing method of a semiconductor integrated circuit, comprising:

a standard cell synthesizing step of synthesizing a net list from an RTL (register transfer level) description of a circuit structure so as to form an instance name list which contrasts a register description portion contained in the RTL description with an instance name;

a simulation step of inputting thereinto an applied actual operation pattern so as to perform an operation simulation written by the RTL description;

a toggle storing step of recording toggle information among registers extracted in the simulation step;

a mapping step of constituting flip-flop-to-flip-flop toggle information database in which the toggle information acquired from the toggle storing step corresponds to a flip-flop-to-flip-flop instance name acquired from the instance name list; and an electric power optimizing step of optimizing a physical designing operation in order to reduce power consumption by employing the net list, the flip-flop-to-flip-flop toggle information database, and an arbitrarily applied timing restriction, wherein cell groups on a layout are separated from each other based upon activating rates, and a power supply control is applied while a non-activating region is set as a separate power supply.

* * * * *